United States Patent [19]

Sasao et al.

[11] Patent Number: 5,183,652
[45] Date of Patent: Feb. 2, 1993

[54] RADIOACTIVE CATALYST AND OXIDATION-REDUCTION METHOD AND APPARATUS USING SAME

[75] Inventors: Nobuyuki Sasao, Naka; Yukio Wada, Mito, both of Japan

[73] Assignee: Doryokuro Kakunenryo Kaihatsu Jigyodan, Tokyo, Japan

[21] Appl. No.: 773,121

[22] Filed: Oct. 8, 1991

Related U.S. Application Data

[60] Division of Ser. No. 631,998, Dec. 21, 1990, Pat. No. 5,093,302, which is a continuation-in-part of Ser. No. 404,966, Sep. 8, 1989, abandoned.

[30] Foreign Application Priority Data

Oct. 1, 1988 [JP] Japan .................................. 63-248755

[51] Int. Cl.$^5$ ......................... C01B 3/04; C01B 13/02
[52] U.S. Cl. .................... 423/579; 422/159; 422/211; 423/658.2; 423/659
[58] Field of Search ............... 423/648.1, 658.2, 579, 423/659; 422/159, 211

[56] References Cited

U.S. PATENT DOCUMENTS

| | | | |
|---|---|---|---|
| 4,205,959 | 6/1980 | Ito | 208/17 |
| 4,427,749 | 1/1984 | Graetzel et al. | 204/278 |
| 4,532,026 | 7/1985 | Fries | 208/164 |
| 4,598,128 | 7/1986 | Randall et al. | 525/740 |
| 4,774,026 | 9/1988 | Kitrinoli et al. | 204/157.1 |

Primary Examiner—Wayne Langel
Attorney, Agent, or Firm—Wenderoth, Lind & Ponack

[57] ABSTRACT

A radioactive catalyst is disclosed which comprises a fine particle of semiconductor and a high radioactive platinum group element deposited on the particle of semiconductor. The radioactive catalyst serves as a source of radiation and also as a catalyst for oxidation-reduction reaction. By bringing the radioactive catalyst into contact with water, the water is decomposed by the oxidation-reduction reaction to produce hydrogen and oxygen.

4 Claims, 2 Drawing Sheets

RADIOACTIVE CATALYST AND OXIDATION-REDUCTION METHOD AND APPARATUS USING SAME

CROSS-REFERENCE TO RELATED APPLICATIONS

This application is a divisional application of Ser. No. 07/631,998 filed Dec. 21, 1990, now U.S. Pat. No. 5,093,302, which is a continuation-in-part application of Ser. No. 07/404,966 filed Sep. 8, 1989, now abandoned.

FIELD OF THE INVENTION

The present invention relates to a radioactive catalyst which per se serves as a source of reaction energy for an oxidation-reduction (redox) reaction and also has a catalytic action, and also relates to an oxidation-reduction technique using the radioactive catalyst.

There has already been known in the art a technique of using a catalyst prepared by depositing a platinum group element on a fine particle of semiconductor and irradiating light from outside to the catalyst to cause an oxidation-reduction reaction. The catalyst of this kind is referred to as a "photocatalyst". The oxidation-reduction reaction using the photocatalyst has drawn increasing attention as one of the methods of solar energy development and vigorous research and development has been carried out. An attempt has been made to produce hydrogen and oxygen by decomposing water with such a technique, for example, and to use these products as electrical or thermal energy.

However, decomposition efficiency of water by light in accordance with the prior art technique is so low that the prospect of practical utilization is still far from certain. This is because, in order to form electron-hole pairs in the semiconductor of the photocatalyst and to cause the oxidation-reduction reaction, photons of a photo-energy of at least about 3 eV are necessary and only a limited ultra-violet range of light can be utilized.

In addition, the following practical problems are left yet unsolved. Namely, an apparatus must be made of a transparent material in order to utilize solar energy and since irradiation of light is made only unidirectionally, the rays of light cannot irradiate all of the fine particles of the photocatalyst if the concentration of the photocatalyst particles is high. Therefore, the apparatus using the photocatalyst becomes large plane-wise. Furthermore, the operation of the apparatus depends on weather and day and night. Thus, there are various problems yet to be solved in fabrication and installation of the apparatus.

On the other hand, the production of hydrogen and oxygen by decomposition of water has been carried out by electrolysis at present and involves the problem of an extremely lare quantity of electric energy required therefor.

SUMMARY OF THE INVENTION

It is therefore an object of the present invention to provide a novel catalyst and an oxidation-reduction technique using such a novel catalyst which can solve the above-described prior art problems, and which can efficiently conduct the oxidation-reduction reaction and can proceed with the reaction successively, without the use of solar energy which has some limitations, and without substantial maintenance of equipment.

It is another object of the present invention to provide a technique which can effectively utilize high radioactive wastes and can thereby obtain clean energy.

According to the present invention, the above-described objects can be accomplished by a radioactive catalyst which comprises a fine particle of semiconductor and a high radioactive platinum group element deposited on the particle of semiconductor. Thus the radioactive catalyst can serve as a source of radiation of reaction energy and also has a catalytic action for oxidation-reduction reaction.

The term "radioactive catalyst" used herein has been created by the inventors of the present invention on the basis of the conventional term "photocatalyst" and has not yet been established scientifically. Such a novel term has inevitably been employed for convenience sake, since a catalyst having both the radiation source and the catalytic action has not yet been known in the art and a suitable term is not therefore known.

According to another aspect of the present invention, there is provided an oxidation-reduction method which comprises bringing the above-described radioactive catalyst into contact with a fluid to be processed to produce electron-hole pairs in the semiconductor of said catalyst by the radiation generated from said high radioactive platinum group element deposited on said semiconductor particle, thereby causing the oxidation-reduction reaction. By using the oxidation-reduction method of the present invention, oxygen and hydrogen can be produced from water.

According to another aspect of the present invention, there is provided an oxidation-reduction apparatus which comprises a container in which the above-described radioactive catalyst is packed, means for supplying a fluid to be processed into said container, and means for discharging products of oxidation-reduction reaction from said container.

The high radioactive platinum group elements such as, for example, ruthenium-106 and the like can be recovered from a spent nuclear fuel. These metals have conventionally been discarded as high radioactive wastes, but can effectively be utilized as a new energy source according to the present invention.

The high radioactive platinum element deposited on the semiconductor particle is per se an energy source and generates radiation. This radiation produces electron-hole pairs in the semiconductor particle. Energy of radiation is greater by about $10^5$ to $10^6$ times than energy of light. Therefore, the oxidation-reduction reaction can be carried out at a high efficiency. If water is used as the fluid to be processed, for example, and is brought into contact with the radioactive catalyst, water can be decomposed efficiently.

The energy source used in the present invention is not the rays of light irradiated from outside as in the prior art technique but the radiation irradiated from inside, and thus the reaction proceeds throughout the radioactive catalyst even when any container or tube for containing the radioactive catalyst is employed. Also from this viewpoint, the efficiency of the reaction becomes extremely high.

As described above, since the radiation is generated from inside and irradiated in all directions, radiation spreads sufficiently even when the concentration of the particles of the radioactive catalyst becomes high and, since a higher concentration results in high effeciency, the apparatus can be made more compact in scale. Accordingly, various limitations resulting from the utilization of solar energy can be eliminated.

When various useful metals recovered from the spent nuclear fuel are used as the high radioactive platinum group element, effective utilization of the high radioactive wastes can be made and clean energy such as hydrogen and oxygen can be thereby produced.

PREFERRED EMBODIMENTS OF THE INVENTION

Figure 1:
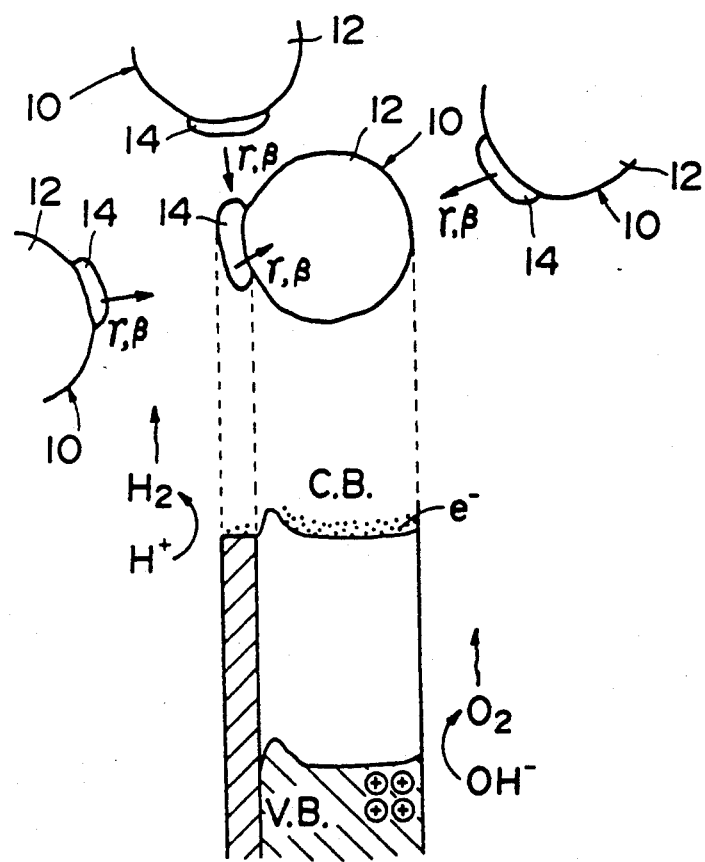
FIG. 1 is an explanatory view showing a radioactive catalyst and its energy diagram in accordance with the present invention.

FIG. 1 is an explanatory view showing the radioactive catalyst and the oxidation-reduction reaction using the catalyst in accordance with the present invention. The respective particles of the radioactive catalyst 10 have a structure wherein a high radioactive platinum group element 14 such as ruthenium-106 is deposited or supported on a fine particle (preferably having a particle size of 0.1 to 10 $\mu$m) of n-type semiconductor 12 such as titanium oxide. The platinum group elements recovered from the spent nuclear fuel can be employed as the platinum group element of the radioactive catalyst 10. Besides ruthenium, rhodium or palladium may be used as the platinum group element. From the aspect of high radioactivity, however, preferred is ruthenium-106.

The fluid to be processed is brought into contact with the radioactive catalyst 10. An example of the fluid to be processed is water. If water is used, hydrogen and oxygen can be produced by the oxidation-reduction reaction. In FIG. 1, the lower half represents an energy diagram. When the fine particle of semiconductor 12 is excited by the high radiation energy generated from the radioactive platinum group element 14, electrons are produced and gathered at the conduction band (C.B.) while positive holes are produced and gathered at the valence band (V.B.). The radiation energy generated from the high radioactive platinum group element 14 is from about $10^5$ to about $10^6$ eV and is by far greater than the band gap of the fine particle of semiconductor 12 so that a large number of electron-hole pairs can be formed. The oxidation-reduction reaction such as the decomposition of water can be carried out by utilizing these large number of electron-hole pairs. In other words, hydrogen ions are reduced to hydrogen gas by the electrons in the conduction band while hydroxyl ions are oxidized to produce oxygen gas by the positive holes in the valence band. In the present invention, since the radioactive catalyst itself has the action of the generation source of the reaction energy as well as the action of the catalyst, the oxidation-reduction reaction can always be continued by merely bringing the fluid to be processed into contact with the catalyst.

The result of tentative calculation when hydrogen and oxygen are produced by using the radioactive catalyst of the present invention will be described hereinbelow. It is assumed that ruthenium-106 recovered from the spent nuclear fuel is used as the high radioactive platinum group element. Radioactivity of ruthenium-106 is 3,300 Ci/g $^{106}$Ru. The radiation energy of about 500 keV resulting from $^{106}$Rh which is a decay product of $^{106}$Ru and in radiation equilibrium with $^{106}$Ru, is assumed to be all the energy contributed to the reaction, and the radiation energy resulting from the other $\beta$ rays is neglected. All of this radiation energy is assumed to contribute to the formation of the electron-hole pairs and all of the resulting electron-hole pairs are assumed to contribute to the decomposition of water.

(1) Since the decay constant is $3.7 \times 10^{10}$, the resulting electron-hole pairs per hour are given as follows:

$$3,300 \text{Ci/g}^{106}\text{Ru} \times 3.7 \times 10^{10} \times 5 \times 10^5 \text{eV}/3\text{eV} \times 60\text{min} \times 60\text{sec} = 7.33 \times 10^{22}$$

(2) The amount of the produced hydrogen gas per hour is given as follows:

$$7.33 \times 10^{22}/2 \times 6.02 \times 10^{23}$$
$$= 6.07 \times 10^{-2} \text{ mol H}_2/\text{hr}$$
$$= 1.35 \text{ l H}_2/\text{hr}.$$

(3) Accordingly, the recovery amount of Ru required for a pilot plant (1 m$^3$ H$_2$/hr) is given as follows:

$$1,000\text{l}/1.35\text{l} \rightarrow 0.74 \text{Kg}^{106}\text{Ru}$$

Since $$^{106}\text{Ru/Ru} = 0.05,$$

$0.74/0.05 = 14.8$ Kg Ru (the recovered amount of Ru).

This amount of ruthenium corresponds to the recovery amount from 10 tons of the spent fuel from a light water reactor and is a sufficiently practical amount.

Figure 2:
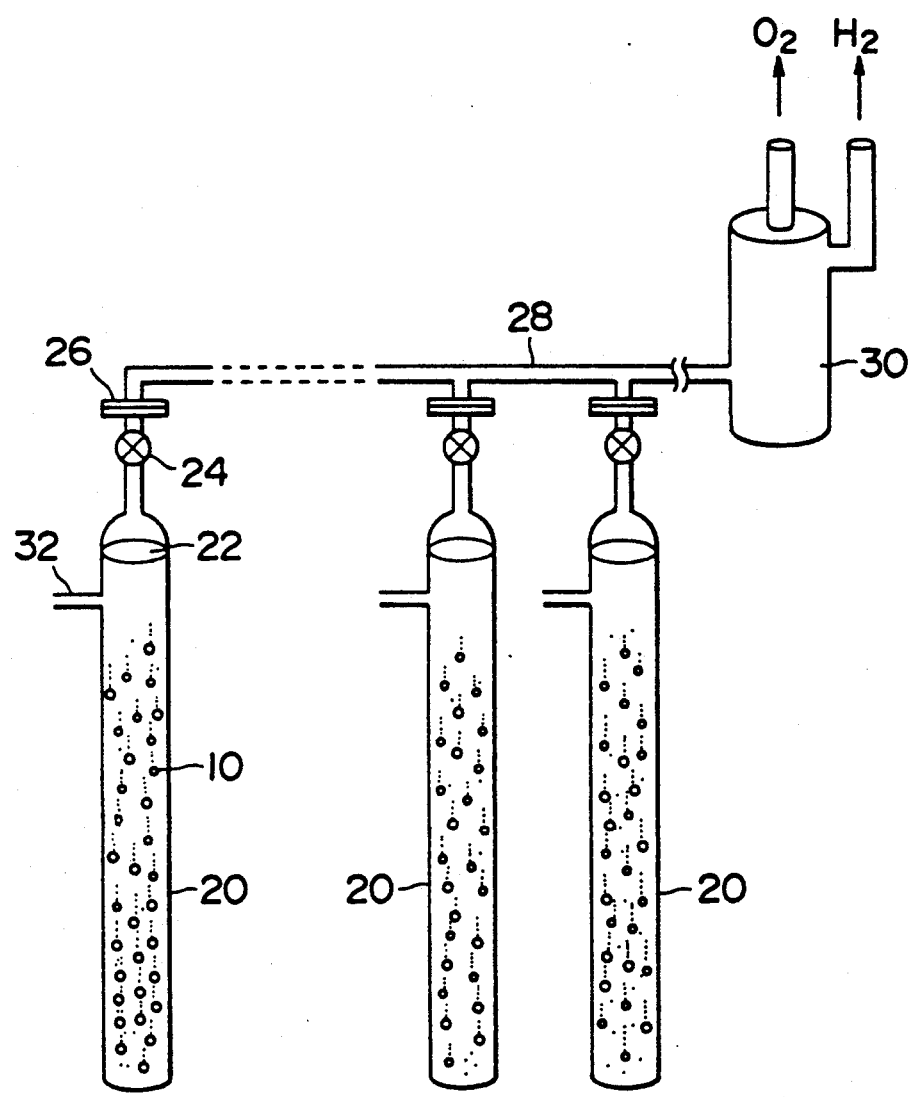
FIG. 2 is an explanatory view showing an example of a water decomposition apparatus using the radioactive catalyst of the present invention.

FIG. 2 shows an example of a water decomposition apparatus according to the present invention. This represents an example of a single reaction column system. A plurality of particles of radioactive catalyst 10 are packed into a tubular reaction container or column 20 and water 22 as a fluid to be processed is introduced into the tubular reaction column 20. The particles of the radioactive catalyst are prepared by depositing a high radioactive platinum group element on a fine particle of semiconductor. as described hereinbefore. A valve 24 is disposed at the upper part of the reaction column 20 and is connected to a gathering pipe 28 through a flange 26. A plurality of reaction columns 20 having the redioactive catalyst particles packed therein are juxtaposed with one another. The gathering pipe 28 is connected to a hydrogen storage tank 30 in which a hydrogen storage alloy is packed. A water supply pipe 32 is connected to each reaction column 20.

Water 22 is decomposed by the radioactive catalyst 10 to thereby produce oxygen and hydrogen. They are introduced through the gathering pipe 28 into the hydrogen storage tank 30 in which only hydrogen is absorbed and oxygen passes as it is. Hydrogen absorbed by the hydrogen storage alloy is desorbed and separated by another cycle and is taken out as a hydrogen gas. A plurality of hydrogen storage tanks 30 may be juxtaposed with one another so that when part of them are operated in the hydrogen absorption cycle, the rest are operated in the hydrogen desorption cycle. In this manner, a continous operation can be carried out.

There is no possibility that the hydrogen gas and oxygen gas thus withdrawn are contaminated by radioactivity. Therefore, they can be utilized as clean energy. Water consumed due to the decomposition in the column 20 may be suitably supplemented from the water supply pipe 32.

Once the apparatus has been installed, it can be continuously operated night and day for at least about two years by merely supplementing water without necessity of maintenance and replacement. The half life of ruthenium-106 is 368 days. When it is desired to use it as the catalyst even after the half life, each reaction column 20 may be installed inside a radioactive liquid waste tank (not shown). Namely, by introducing a high radioactive liquid waste ($10^5$–$10^6$ Ci/tank) into the tank to utilize the radioactivity thereof, the decomposition of water may successively be carried out in the reaction column installed inside the tank.

As being understood from the foregoing, according to the radioactive catalyst of the present invention wherein the high radioactive platinum group element is deposited on the fine particle of semiconductor, the oxidation-reduction reaction can be carried out at a high efficiency, since the catalyst itself has the action of the high energy radiation source as well as the action of the catalyst, and since the radiation generated from inside is used as the reaction energy.

Therefore, the catalyst of the present invention is free from the drawbacks of the prior art photocatalyst utilizing solar rays in that the solar energy is relatively low and depends on the weather and day and night, and the rays of light cannot irradiate all of the photocatalyst particles if the concentration of the photocatalyst particles is high. Thus, according to the method and apparatus using the radioactive catalyst of the present invention, freedom of design of the apparatus is high, and the apparatus can be assembled compactly so that the limitations to the installation space thereof are small.

In addition, since the radioactive substances recovered from the spent nuclear fuel such as ruthernium-106 can be utilized, effective utilization of the high radioactive wastes can be made.

Furthermore, since rays of light are not used, the reaction proceeds inside the sealed container of a metal or the like and the apparatus can be assembled at a low cost. Once installed, the apparatus does not need maintanance and replacement for a few years so that maintenance becomes easier and the operation cost becomes extremely low.

What is claimed is:

1. An oxidation-reduction method comprising providing a radioactive catalyst comprising a fine particle of semiconductor having a particle size of 0.1 to 10 μm, and a radioactive platinum group element, which generates radiation energy of about $10^5$ to about $10^6$ eV, deposited on said particle of semiconductor, whereby said radioactive catalyst can serve as a source of radiation and also as a catalyst for an oxidation-reduction reaction; bringing the radioactive catalyst into contact with a fluid to be processed to produce electron-hole pairs in the semiconductor of said catalyst by radiation generated from said radioactive platinum group element deposited on said semiconductor particle; and thereby causing an oxidation-reduction reaction.

2. The method according to claim 1 wherein said fluid to be processed is water which is decomposed by the oxidation-reduction reaction to produce hydrogen and oxygen.

3. An oxidation-reduction apparatus comprising a container packed with a radioactive catalyst comprising a fine particle of semiconductor having a particle size of 0.1 to 10 μm, and a radioactive platinum group element, which generates radiation energy of about $10^5$ to about $10^6$ eV, deposited on said particle of semiconductor, whereby said radioactive catalyst can serve as a source of radiation and also as a catalyst for an oxidation-reduction reaction; means for supplying a fluid to be processed into said container; and means for discharging products of oxidation-reduction reaction from said container.

4. The apparatus according to claim 3, wherein said means for discharging products from said container is connected to a tank packed with a hydrogen storage alloy.

* * * * *